United States Patent [19]

Suzuki et al.

[11] 4,205,214
[45] May 27, 1980

[54] APPARATUS FOR MACHINING FLASH AND UPSET MATERIAL FORMED IN FLASH WELDING OPERATION

[75] Inventors: Takao Suzuki; Yoshimasa Komatsu, both of Chita; Akimichi Takeda; Toshihiko Baba, both of Amagasaki, all of Japan

[73] Assignees: Mitsubishi Denki Kabushiki Kaisha; Nippon Steel Corporation, both of Tokyo, Japan

[21] Appl. No.: 923,225

[22] Filed: Jul. 10, 1978

[30] Foreign Application Priority Data

Jul. 12, 1977 [JP] Japan .................................. 52-83456

[51] Int. Cl.² ........................................ B23K 11/04
[52] U.S. Cl. ...................................... 219/97; 219/100
[58] Field of Search ......................... 219/97, 100, 101

[56] References Cited
U.S. PATENT DOCUMENTS 3,278,719   10/1966   Seeloff .................................. 219/97

Primary Examiner—E. A. Goldberg
Attorney, Agent, or Firm—Oblon, Fisher, Spivak, McClelland & Maier

[57] ABSTRACT

A flash and upset material formed in a flash welding operation can be removed by a machining of the flash and upset material for a short time after the welding operation by providing a workpiece clamping function by a main clamp and providing a welding current feeding function by an electrode table. The main clamp is heavy whereas the electrode table is light so as to be easily movable, whereby the electrode table in the light weight can be backwardly shifted for a short time after the welding operation and a space for inserting a tool holder equipping with a tool for machining a flash and upset material, is formed near the welded line. Since the flash and upset material can be machined during the time maintaining the softness of the flash and upset material at relatively high temperature for a short time, the machining can be attained by only pair of tools.

6 Claims, 7 Drawing Figures

APPARATUS FOR MACHINING FLASH AND UPSET MATERIAL FORMED IN FLASH WELDING OPERATION

BACKGROUND OF THE INVENTION

1. Field of the Invention

The present invention relates to an apparatus for machining a flash and upset material formed in a flash welding operation.

2. Description of the Prior Art

Heretofore it has been known to employ an apparatus for machining a flash and upset material formed in a welding operation, as shown in FIG. 1.

In FIG. 1, a stationary frame (3) and a movable frame (4) are disposed in the direction transferring workpieces (1),(2) and the movable frame (4) is shifted to the stationary frame (3) in the horizontal direction.

A lower stationary side electrode table (5b) and an upper stationary side electrode table (5a) are respectively fitted on the stationary frame (3). The upper stationary side electrode table (5a) is vertically shifted by a pressing device (7) to clamp the workpiece (1). The lower movable side electrode table (6b) and the upper movable side electrode table (6a) are also respectively fitted on the movable frame (4) and the upper movable side electrode table (6a) is vertically shifted by a pressing device (8) to clamp the workpiece (2).

The position of the movable frame (4) is controlled by an upset device (9).

After the completion of the welding operation, an upper tool holder (10) and a lower tool holder (11) which are waited out of the welding apparatus, are shifted to the direction of the welding line on the guide surfaces of the stationary side tool holder guides (14a),(14b) and the movable side tool holder guides (15a),(15b) whereby the flash and upset material is removed by machining with tools (12),(13) held by the upper tool holder (10) and the lower tool holder (11).

FIG. 2 is an enlarged view of the tool holder guides of FIG. 1.

In general, these welding apparatuses are used for welding various sheets from a thin sheet (about several mm) to a thick sheet (about several tens mm), and accordingly, a gap L between the electrode tables is varied at the starting and finishing depending upon the thickness of the sheet.

The operation will be illustrated.

The workpieces (1),(2) are clamped between the electrode tables with a predetermined gap being proportional to a thickness of the workpiece and then, the flash welding operation is started. The gap L between the electrode tables after the completion of the welding operation is too narrow in comparison with the space required for the machining of the flash and upset material, whereby it is difficult to machine the flash and upset material in this condition. The upper movable side electrode table (6a) is ascended after the welding operation, and the movable frame (4) is shifted to the space required for the machining of the flash and upset material and then, the upper movable side electrode table (6a) is descended to clamp the workpiece. If necessary, the upper stationary side electrode table (5a) is ascended and the workpiece is drawn out for a small distance by the movable side electrode tables (6a),(6b) and the welded part is departed for a small distance from the stationary side electrode tables (5a),(5b) and the movable side electrodes (6a),(6b) are backwardly shifted for a small distance to give a space for the gap 1 between the tool holder guides (14a),(14b), (15a),(15b). Thus, the welded part is shifted to the position between the electrode tables. As discussed above, it is necessary to vary the initial gap between the electrode tables from the final gap depending upon the size of the workpieces (1),(2). Various kinds of workpieces are usually welded by this type welding apparatus, whereby it may be necessary to vary the gap between the electrode tables depending upon the kind of the workpiece. That is, when large workpieces (1),(2) are welded, a size of the flash and upset material is large to be a wide gap between the electrode tables at the completion of the welding operation. On the other hand, when samll workpieces (1),(2) are welded, a size of the flash and upset material is small to be a narrow gap between the electrode tables at the completion of the welding operation. Accordingly, the space between the electrode tables is broadened to the space suitable for the machining.

As it is well-known significant large forces caused in the pressing of the workpieces are received by the electrode tables (5a),(5b), (6a),(6b), whereby the electrode tables are usually large and heavy and large pressing devices (7), (8) are needed and considerable time and energy are needed for the ascending, descending and shifting of the electrode table.

The time required from the completion of the welding to the machining of the flash and upset material is too long in the ascending, descending and shifting of the heavy electrode table whereby the temperature of the flash and upset material is lowered to harden the welded part and the resistance in the machining is increased and the standstill time for the line is prolonged, disadvantageously. Accordingly, in the conventional line, the machining of the flash and upset material has been carried out with 4 to 5 tools for each of the upper surface and the lower surface in order to attain the machining under high resistance in the machining.

SUMMARY OF THE INVENTION

It is an object of the present invention to overcome the above-mentioned disadvantages and to provide an apparatus for machining a flash and upset material which comprises main clamps and an electrode table which can easily ascend, descend and shift so as to attain the machining just after a welding operation.

It is another object of the present invention to attain the machining of the flash and upset material for a short time after the welding operation by allotting a workpiece clamping function to a main clamp and allotting a welding current feeding function to an electrode table.

In the apparatus of the present invention, the main clamp is heavy whereas the electrode table is light so as to be easily movable and the electrode table in the light weight can be backwardly shifted for a short time after the welding operation and a space for inserting a tool holder equipping with a tool for machining the flash and upset material is formed near the welding line.

In the apparatus of the present invention, the flash and upset material can be machined during the time maintaining the softness of the flash and upset material at relatively high temperature for a short time to attain the machining by only one pair of tools.

BRIEF DESCRIPTION OF THE DRAWINGS

FIG. 1 is a front view of a conventional welding apparatus;

FIG. 2 is an enlarged view of a tool holder guide in the conventional welding apparatus;

FIG. 3 is a front sectional view of one embodiment of the welding apparatus according to the present invention;

DESCRIPTION OF THE PREFERRED EMBODIMENT

Figure 4:
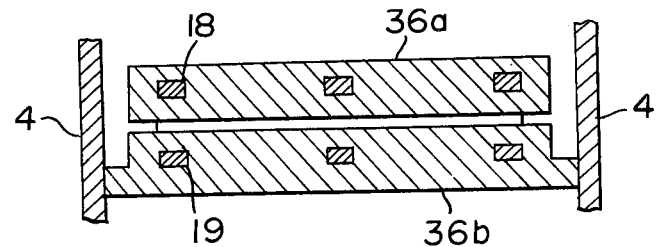
FIG. 4 is a sectional view taken along the line IV—IV of FIG. 3.

Referring to the drawings, one embodiment of the apparatus for machining a flash and upset material will be illustrated.

Figures 1, 2, 3:
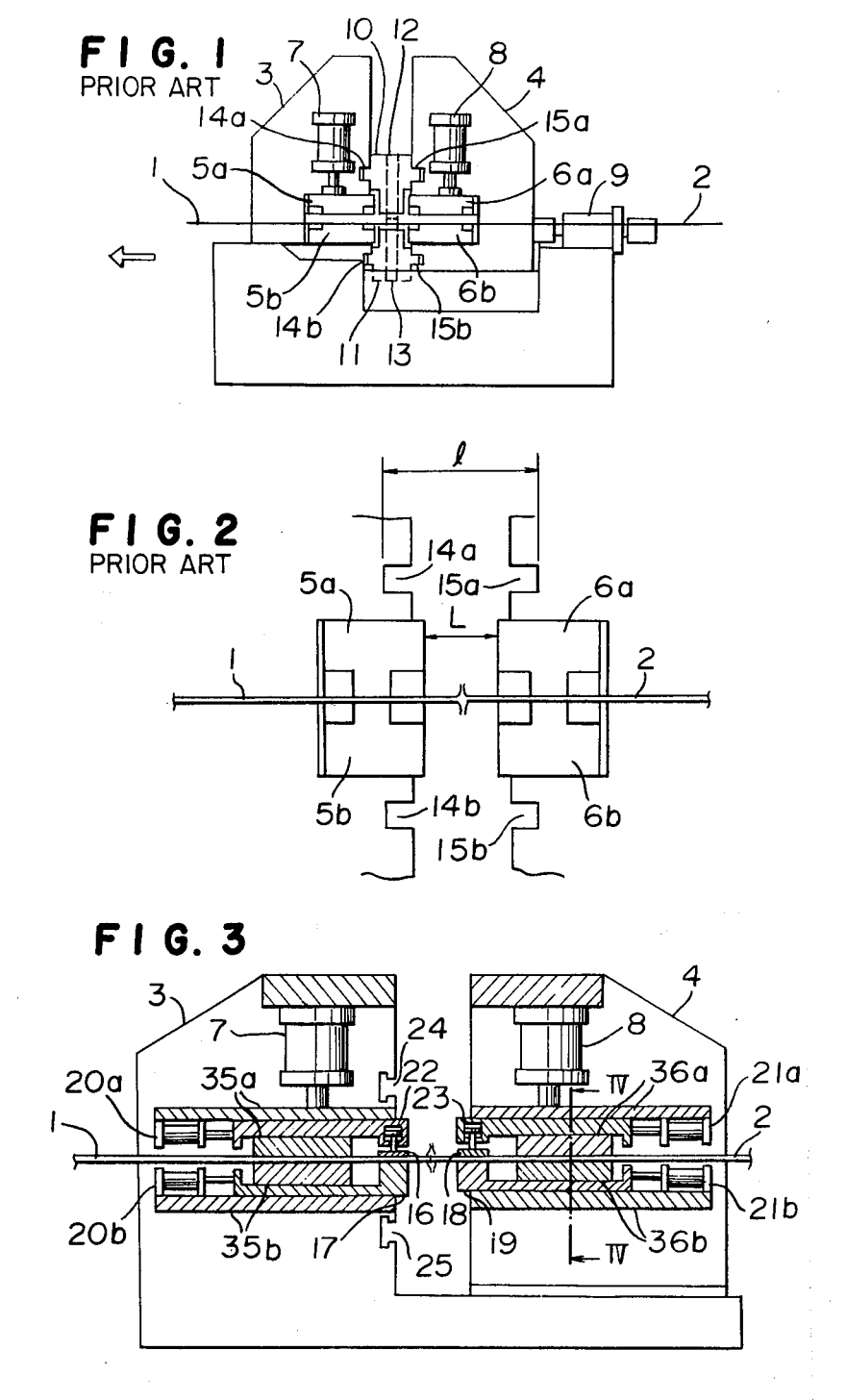

FIG. 3 shows one embodiment of the present invention which has a principle novel feature of a separation of a function for clamping the workpieces, and functions for adjusting the projecting degree, feeding current and preventing a backing of the workpiece, which is different from the feature of the conventional apparatus.

A stationary side electrode projecting degree adjustor (20a) is mounted on a guide for a stationary side main clamp (35a) and a upper stationary side electrode table (16) and a stationary side electrode table pressing device (22) are disposed front of the adjustor (20a). A stationary side electrode projecting degree adjustor (20b) is mounted on a guide for a stationary side main clamp (35b), and a lower stationary side electrode table (17) is disposed in front of the adjustor (20b) at the lower part.

In the movable side, as the same with those of the stationary side, a movable side main clamp (36a), a movable side electrode projecting degree adjustor (21a), an upper movable side electrode table (18) and a movable side electrode table pressing device (23) are disposed at the upper part and a movable side main clamp (36b), a movable side electrode projecting degree adjustor (21b) and a lower movable side electrode table (19) are disposed at the lower part.

Tool holder guides (24),(25) are mounted on the stationary frame (3).

FIG. 4 is a sectional view taken along the line IV—IV of FIG. 3 wherein the electrode tables (16),(17),(18),(19) are laid out in the inner parts of the main clamps (35a),(35b),(36a),(36b).

Figure 5:
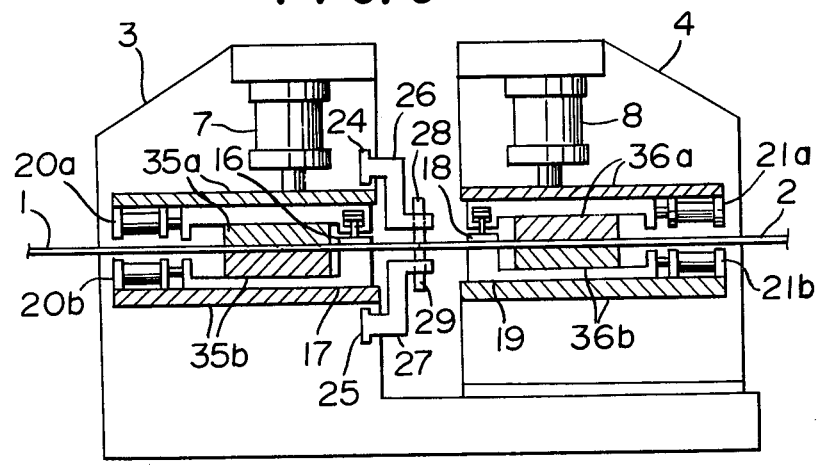
FIG. 5 is a front sectional view of the welding apparatus showing the condition of machining the flash and upset material and FIG. 6 is a partially enlarged view of the other embodiment of the present invention.

FIG. 5 shows the condition that the electrode projecting degree adjustors (20a),(20b),(21a),(21b) are respectively drawn back after the welding in the conditon of FIG. 3 and the upper tool holder (26) equipped with the tool (28) and the lower tool holder (27) equipped with the tool (29) are respectively inserted along the tool holder guides (24),(25).

In accordance with the apparatus of the present invention, the upper electrode tables (16),(18) are ascended and shifted just after the welding operation, and then, the electrode tables (16),(18) are descended to give a space for passing the tool holders (26),(27) for machining the flash and upset material and then, the tool holders (26),(27) equipped with the tools (28),(29) are forwardly shifted to remove the flash and upset material by the machining.

Figure 6:
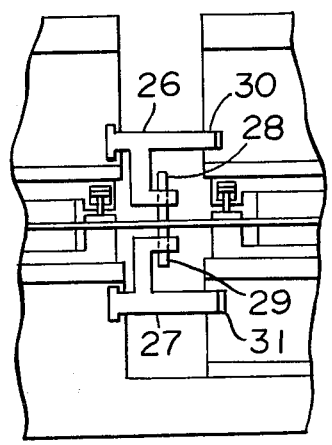

The tool holders (26),(27) can be a one side holding structure mounted on the stationary side as shown in FIG. 5 or a two side holding structure held by the movable frame (4) as shown in FIG. 6.

It is advantageous to be free in the right and left direction of tool holder auxiliary guides (30),(31) and to control in the vertical direction thereof.

Figure 7:
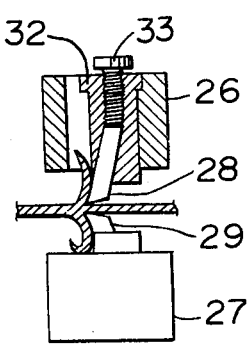
FIG. 7 is a partial view of a tool holder equipped with a tool.

FIG. 7 shows one embodiment of the tool holder equipped with the tool for machining the flash and upset material, wherein the tools (28),(29) are held by a socket (32) to adjust the projecting degree by adjusting bolt (33) and the socket (32) is mounted on the tool holders (26), (27).

In the above-mentioned embodiment, the electrode tables (16),(18) are ascended and then, they are shifted.

The pressing forces required for the electrode tables (16), (18) are considerably smaller than those of the main clamps (35a),(35b), (36a),(36b). Thus, when the electrode tables (16),(18) are shifted under sliding them between the workpieces and the electrode tables (16),(18) by decreasing a hydraulic pressure of the pressing devices (22),(23), the time can be shortened and the superior effect can be attained.

In the above-mentioned embodiment, the tool holder guides (24),(25) and the auxiliary guides (30),(31) are respectively mounted on the stationary frame (3) and the movable frame (4). Thus, the same function can be attained by mounting the tool holder guides and the auxiliary guides on the main clamps (35a),(35b), (36a),(36b).

In the above-mentioned embodiment, only one tool is equipped for each of the upper and lower surfaces. Thus, it is effective to equip the optimum number of the tools from the viewpoints of the life of the tool and the accuracy of the machining surface etc.

In accordance with the present invention, the object can be attained only by moving the electrode tables (16), (17), (18), (19) in light weight without moving the heavy electrode tables (5a), (6a) as the conventional apparatus, whereby the time from the completion of the welding operation to the initiation of the machining of the flash and upset material, can be shortened and the flash and upset material can be machined at relatively high temperature.

That is, the hot machining can be attained to reduce the duty of the tool so as to attain the maching with a pair of the tools for both of the upper and lower surfaces.

This fact is advantageous from the viewpoints of a simple structure of the tool holders and the setting and maintenance of the tools and the dust treatment. Moreover, the strokes of the tools can be shortened by machining only one pair of the tools for both surfaces and the machining can be performed in a lower specific resistance in the machining by machining at higher temperature to reduce the load for the tools and to prolong the lives of the tools.

What is claimed is:

1. An apparatus for machining flash and upset material formed on a workpiece in a flash welding operation, said apparatus comprising:
    a pair of main clamps for clamping a workpiece, said main clamps being disposed so as to face a weld line;

a pair of electrode tables for feeding a welding current to said workpiece, said electrode tables being disposed nearer to said weld line than said main clamps and being adapted to be shifted relative to said weld line;

a tool holder adapted to be movably inserted into a space between said electrode tables and adapted to be movable in said space along said weld line;

means for shifting said electrode tables relative to said weld line;

means for moving said tool holder in said space along said weld line; and at least one tool held by said tool holder, whereby the shifting of said electrode tables permits said tool holder to move with said tool along said weld line so as to machine said flash and upset material formed around said welding line.

2. An apparatus according to claim 1 wherein a pair of said tools perform a machining of the front and rear surfaces of said workpiece.

3. An apparatus according to claim 1 wherein a pair of said main clamps are respectively mounted on each of a stationary frame and a movable frame.

4. An apparatus according to claim 3 wherein said tool holder is shifted while fitted to a holder guide groove formed on said stationary frame at the side of said frame facing said welding line.

5. An apparatus according to claim 3 wherein said tool holder is shifted while fitted to said stationary frame at the side of said frame facing said welding line and also fitted to a holder guide groove at the side of said movable frame facing the welding line.

6. An apparatus according to claim 1 wherein each of said electrode tables comprises a stationary electrode electrode table and a movable electrode table shifted by a pressing device.

* * * * *